(12) United States Patent
Buckley

(10) Patent No.: US 11,713,814 B2
(45) Date of Patent: Aug. 1, 2023

(54) ROTATING SEAT ASSEMBLY

(71) Applicant: ST9 Gas and Oil, LLC, The Woodlands, TX (US)

(72) Inventor: Chris Paul Buckley, Montgomery, TX (US)

(73) Assignee: ST9 GAS AND OIL, LLC, The Woodlands, TX (US)

( * ) Notice: Subject to any disclaimer, the term of this patent is extended or adjusted under 35 U.S.C. 154(b) by 800 days.

(21) Appl. No.: 16/580,332

(22) Filed: Sep. 24, 2019

(65) Prior Publication Data

US 2020/0096116 A1  Mar. 26, 2020

Related U.S. Application Data

(60) Provisional application No. 62/735,574, filed on Sep. 24, 2018.

(51) Int. Cl.
| | | |
|---|---|---|
| *F16K 1/44* | (2006.01) | |
| *F16K 17/40* | (2006.01) | |
| *E21B 44/06* | (2006.01) | |
| *E21B 43/16* | (2006.01) | |

(52) U.S. Cl.
CPC .............. *F16K 1/443* (2013.01); *E21B 43/16* (2013.01); *E21B 44/06* (2013.01); *F16K 17/403* (2013.01)

(58) Field of Classification Search
CPC .......... F16K 1/443; F16K 17/403; F16K 1/42; F16K 1/427; F16K 27/02; E21B 21/08; E21B 43/16; E21B 44/06; E21B 43/121; E21B 47/117; E21B 34/14

USPC .......................................................... 251/363
See application file for complete search history.

(56) References Cited

U.S. PATENT DOCUMENTS

| | | | | | |
|---|---|---|---|---|---|
| 1,914,737 | A | * | 6/1933 | Elms ................... | F04B 53/1087 251/114 |
| 1,948,628 | A | * | 2/1934 | Penick ................ | F04B 53/1027 137/906 |
| 2,969,951 | A | * | 1/1961 | Walton ................ | F04B 53/1027 285/379 |
| 2,982,515 | A | * | 5/1961 | Rule ....................... | F16K 1/465 251/332 |
| 3,063,467 | A | * | 11/1962 | Roberts, Jr. ............. | F16K 1/465 251/364 |
| 3,489,170 | A | * | 1/1970 | Leman ................ | F04B 53/1087 251/363 |
| 4,770,206 | A | * | 9/1988 | Sjoberg ............... | F04B 53/1027 137/902 |
| 2019/0226475 | A1 | * | 7/2019 | Stark ..................... | F04B 1/0452 |

* cited by examiner

*Primary Examiner* — Mary E McManmon
*Assistant Examiner* — Andrew J Rost
(74) *Attorney, Agent, or Firm* — Haynes and Boone, LLP

(57) ABSTRACT

The present disclosure provides a valve seat assembly for a fluid end of a hydraulic fracturing pump. The valve seat assembly includes a valve seat having a substantially cylindrical body defined along an axis. The valve seat has a first seat end and a second seat end with a through bore extending between the first and second seat ends. The cylindrical body has an inner cylinder surface and an exterior cylinder surface with an annular flange formed along the exterior cylinder surface adjacent the first seat end. The through bore expands from a first diameter to a second diameter adjacent the first seat end. The valve seat assembly further includes a leak detection notch formed in the exterior cylinder surface between the annular flange and the second seat end.

11 Claims, 5 Drawing Sheets

ROTATING SEAT ASSEMBLY

PRIORITY CLAIM

The present application claims the benefit of U.S. Provisional Application No. 62/735,574, entitled "Rotating Seat Assembly," filed Sep. 24, 2018, herein incorporated by reference in its entirety.

TECHNICAL HELD OF THE INVENTION

The present application relates generally to a reciprocating pump, and in particular to a valve seat for use in a suction or discharge valve assembly.

BACKGROUND OF THE INVENTION

In the modern-day oil and gas industry, unconventional reservoir plays continue to maintain outsized importance. However, there are difficulties in economically producing hydrocarbons from low permeability rock formations. One way to boost production rates is using hydraulic fracturing, a technique that increases rock permeability by opening channels through which hydrocarbons can flow to recovery wells. During hydraulic fracturing, a hydraulic fracturing fluid is pumped into a formation under high pressure (sometimes as high as 50,000 psi) leading to fracturing of the formation to promote release of hydrocarbons. Often, large quantities of proppants are suspended in the hydraulic fracturing fluid and flow into the fractures during the pumping stage. When pressure on the hydraulic fracturing fluid is released and the hydraulic fracturing fluid is recovered from the wellbore, the fractures only partially close because the proppants have wedged within the fractures, leaving open channels for oil and gas to flow.

Specialized hydraulic fracturing pumps are used to deliver fracture fluids at sufficiently high rates and pressures to complete a hydraulic fracturing operation or "frac job." These pumps are usually provided with fluid ends having both reciprocating plungers that place fluids under pressure and valves that control fluid flow to and from the plungers. Fluid ends have many parts that are releasably fastened to one another so that they can be repaired or replaced. These fluid ends experience large amounts of internal stresses from turbulent flows and cavitation as the fracture fluids pass therethrough. By the nature of its operation, a reciprocating pump or fluid end induces turbulent flow and cavitation into the system. These effects can be detrimental to the entire pumping system. These stresses can reduce the life of the fluid end and its internal components.

More particularly, in the fluid end, fracture fluids flow through a suction valve and a discharge valve. Each valve is an assembly including a valve seat and a valve head. A number of issues can arise with conventional valve seats. Proppants and fluids can ingress and build-up around the valve seat. Additionally, when leakage occurs around the valve seat, it can be difficult to detect. Moreover, the valve seat and valve head can undergo extensive wear on sealing surfaces when the valve head continuously contacts the valve seat in the same location and same orientation. When this effect occurs over numerous open/close cycles or throughout the life span of the valve assembly, pre-mature wear of one or more components can result.

BRIEF DESCRIPTION OF THE DRAWINGS

For a detailed description of exemplary embodiments, reference will now be made to the accompanying drawings in which.

Figure 1:
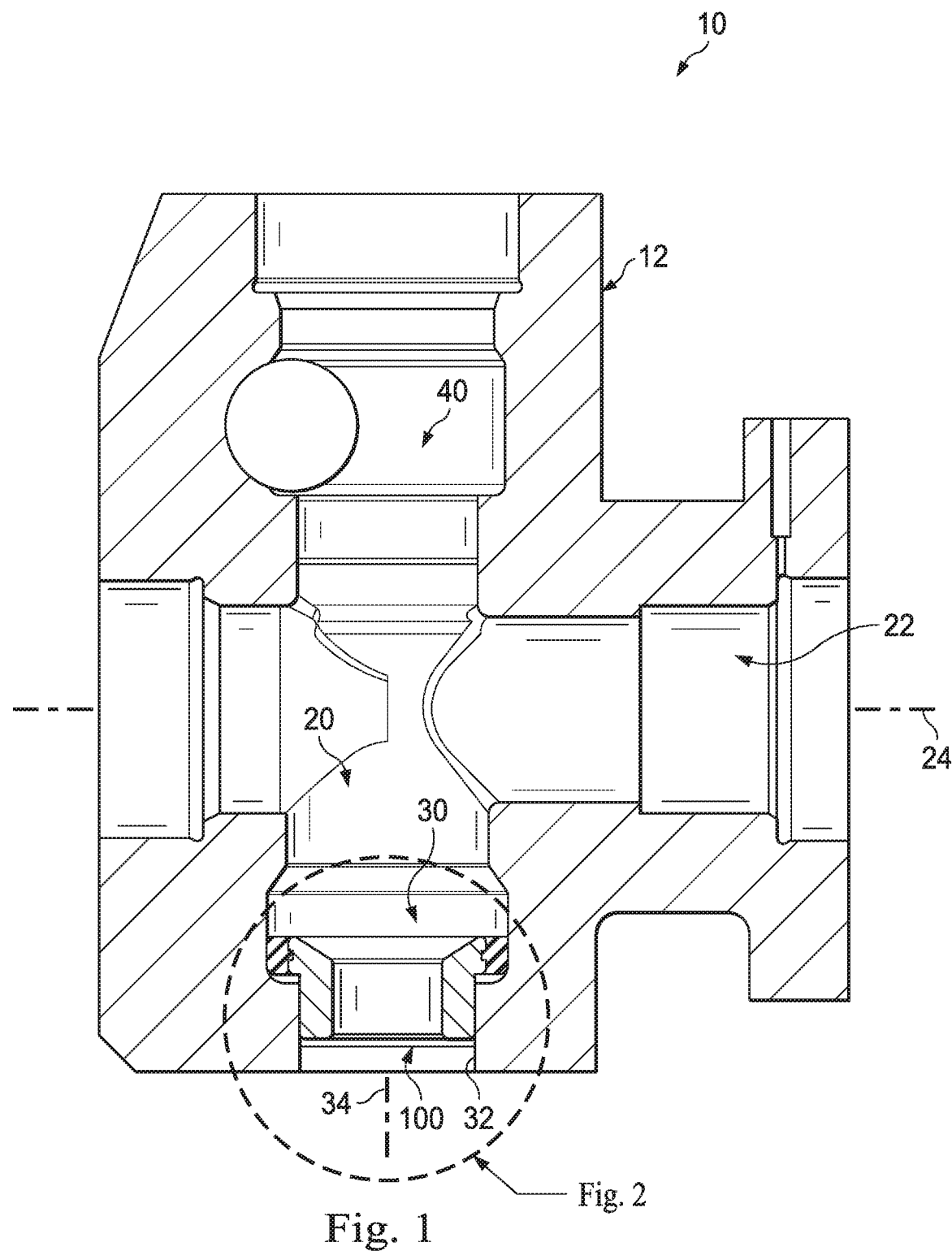
FIG. 1 is a side section view of a fluid end having a valve seat disposed therein in accordance with some embodiments.

While the disclosure is susceptible to various modifications and alternative forms, specific embodiments thereof have been shown by way of example in the drawings and are herein described in detail. It should be understood, however, that the description herein of specific embodiments is not intended to limit the disclosure any particular form, but on the contrary, the intention is to cover all modifications, equivalents, and alternatives falling within the spirit and scope of the disclosure as set forth herein.

DETAILED DESCRIPTION OF THE EMBODIMENTS

Generally described herein is a valve seat for the fluid end of a hydraulic fracturing pump, wherein the valve seat is generally formed of a substantially cylindrical body defined along an axis and having a first seat end and a second seat end with a through bore extending between the first and second seat ends. The valve seat body has an inner cylinder surface and an exterior cylinder surface with an annular flange formed along the exterior cylinder surface adjacent the first seat end, which flange defines a flange shoulder. The bore expands from a first diameter to a second diameter adjacent the first seat end. In one or more embodiments, the valve seat further includes an annular groove formed in the exterior cylinder surface between the flange shoulder and the second seat end. In one or more embodiments, the valve seat includes a helical groove formed in the inner cylinder surface along a portion of the length of the cylinder between the first seat end and the second seat end. In one or more embodiments, the valve seat includes a non-metallic seal disposed on the flange about the exterior cylinder surface between the shoulder and the first seat end.

Referring initially to FIG. 1, a side section view of a fluid end portion 10 of a reciprocating pump is shown. In one or more embodiments, the reciprocating pump may be a hydraulic fracturing pump. Fluid end 10 generally includes a housing 12 for attachment to the reciprocating pump (not shown) and also for attachment of inlet and outlet fluid hoses (not shown) as is well known in the industry. Defined within housing 12 is a pressure chamber 20. Pressure chamber 20 includes a first or suction end 30 for drawing fluid into fluid end 10. In one or more embodiments, first end 30 may enable vacuum-induced intake of frac fluid from a storage tank or other supply source (not shown). A through bore 32 is formed in pump housing 12 at first end 30 generally about axis 34 for communicating fluid flow to pressure chamber 20. Pressure chamber 20 further includes a second or discharge end 40 for discharge of fluid from fluid end 10. In one or more embodiments, second end 40 may enable pressurized discharge of frac fluid for injection into a treatment well (not shown).

Fluid end 10 includes an embodiment of a valve seat 100 disposed therein. In the example illustrated in FIG. 1 and described in conjunction therewith, valve seat 100 is shown as being disposed at first end 30. However, the illustration and accompanying description is merely exemplary and is not intended to be limiting beyond what is specifically recited in the claims that follow. It will be appreciated that in one or more embodiments, valve seat 100 may be disposed at second end 40 as well. Such embodiments may incorporate detailed description of like structures from FIGS. 1-5 without limitation.

Pressure chamber 20 further includes a plunger bore 22 formed generally about plunger axis 24 between first and second ends 30, 40. In one or more embodiments, plunger axis 24 may be disposed at approximately a 90° angle relative to axis 34. This enables a reciprocating plunger (not shown) moving in plunger bore 22 to effect a change in fluid volume in pressure chamber 20 in order to create suction and discharge pressure within fluid end 10.

Figure 2:
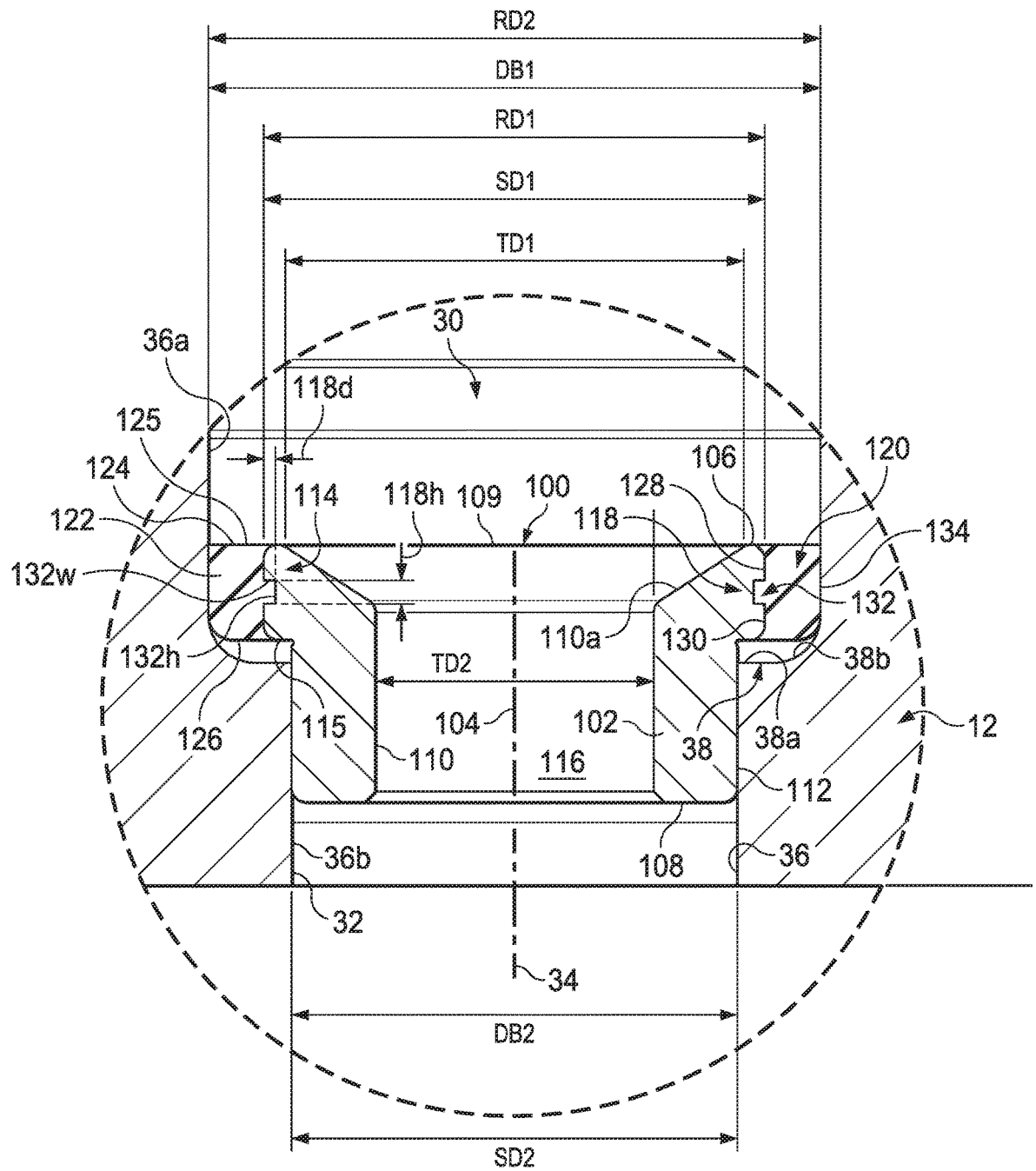
FIG. 2 is a close-up section view of the valve seat of FIG. 1.

Referring now to FIG. 2, a close-up section view of a portion of pump housing 12 is shown, and in particular, first end 30 of pressure chamber 20 is shown having an embodiment of valve seat 100 disposed therein. Through bore 32 at first end 30 is formed of a substantially cylindrical inner surface 36 defined within pump housing 12 along axis 34. Cylindrical inner surface 36 includes a first or downstream end 36a and a second or upstream end 36b. Through bore 32 has a bore diameter DB1 at first bore end 36a and a bore diameter DB2 at second bore end 36b. In one or more embodiments, bore diameter DB1 may be greater than bore diameter DB2.

Formed along bore 32 between first bore end 36a and second bore end 36b is an annular shoulder 38. In one or more embodiments, expansion of through bore 32 from bore diameter DB2 to bore diameter DB1 may form annular shoulder 38 facing first bore end 36a. In one or more embodiments, annular shoulder 38 may include an annular surface 38a disposed at approximately a 90° angle relative to axis 34. In one or more embodiments, annular shoulder 38 may further include a curved or chamfered surface 38b joining annular surface 38a to cylindrical inner surface 36 adjacent to first bore end 36a. In one or more embodiments, annular surface 38a may be disposed at an angle of approximately 60-90° relative to axis 34. In one or more such embodiments, curved surface 38b may be omitted and annular surface 38a may directly join to cylindrical inner surface 36 adjacent to first bore end 36a. It will be appreciated that annular shoulder 38 may include other suitable geometries for interfacing with and/or accommodating valve seat 100.

Valve seat 100 includes a substantially cylindrical body 102 defined along an axis 104. Cylindrical body 102 includes a first or downstream seat end 106 and a second or upstream seat end 108. Cylindrical body 102 further includes an inner cylinder surface 110 and an exterior cylinder surface 112, each extending between first and second seat ends 106, 108. Cylindrical body 102 further includes a valve seat end surface 109 at first seat end 106. In one or more embodiments, inner cylinder surface 110 may include a tapered sealing face 110a for engaging a valve head (not shown). Valve seat 100 may include an annular flange 114 formed along exterior cylinder surface 112 adjacent to first seat end 106, the intersection of flange 114 and exterior cylinder surface 112 forming an annular shoulder 115. Exterior cylinder surface 112 has a seat diameter SD1 along flange 114 between annular shoulder 115 and first seat end 106, and a seat diameter SD2 between annular shoulder 115 and second seat end 108. In one or more embodiments, seat diameter SD2 may be equal to or greater than bore diameter DB2 creating an interference fit between valve seat 100 and cylindrical inner surface 36 when valve seat 100 is disposed at first end 30. Valve seat 100 further includes a through bore 116 extending between first and second seat ends 106, 108. Through bore 116 has a through bore diameter TD1 adjacent to first seat end 106 and a through bore diameter TD2 adjacent to second seat end 108. In one or more embodiments, through bore diameter TD1 may be greater than through bore diameter TD2. In one or more embodiments, through bore 116 may expand from through bore diameter TD2 to through bore diameter TD1 adjacent to first seat end 106 in order to form a tapered sealing face 110a against which a valve head (not shown) may seat.

In one or more embodiments, valve seat 100 may include an annular groove 118 formed in flange 114 between annular shoulder 115 and first seat end 106. While not limited to a particular shape, in one or more embodiments, annular groove 118 may have a rectangular profile, while in one or more other embodiments, annular groove 118 may have rounded corners, and in still other embodiments, annular groove 118 may have a curved profile or may include other suitable shapes. Annular groove 118 may have a depth 118d and a height 118h. In one or more embodiments, depth 118d may be approximately $\frac{1}{32}$-$\frac{1}{8}$ of an inch and height 118h may be approximately $\frac{1}{16}$-$\frac{3}{16}$ of an inch.

In one or more embodiments, valve seat 100 may include a seal 120 disposed about exterior cylinder surface 112 between annular shoulder 115 and first seat end 106. In this regard, in one or more embodiments, seal 120 may be disposed about annular flange 114. Seal 120 may form a fluid-tight seal between valve seat 100 and first end 30 substantially preventing ingress and subsequent build-up of fluid and proppants between valve seat 100 and first end 30. Moreover, seal 120 may function as a seal to prevent or inhibit leakage of pressurized fluid out of pressure chamber 20. Thus, seal 120 may, in effect, mitigate stress corrosion cracking in valve seat 100 and cylindrical inner surface 36 of housing 12.

In one or more embodiments, seal 120 may be removable from valve seat 100. In one or more embodiments, seal 120 may be formed of a non-metallic material including without limitation, elastomers, polymers, engineered plastics, or a combination thereof. In one or more embodiments as illustrated, seal 120 may be annular forming an elongated sealing ring 122. Sealing ring 122 may include a first ring end 124 and a second ring end 126 with a seal end surface 125 formed at the first ring end 124. Sealing ring 122 may further include a through bore 128 extending between first and second ring ends 124, 126.

Sealing ring 122 may further include an inner ring surface 130. Inner ring surface 130 may have a seal ring diameter RD1. In one or more embodiments, seal ring diameter RD1 may be equal to or less than seat diameter SD1 and sealing ring 122 may be circumferentially expanded in order to dispose sealing ring 122 about exterior cylinder surface 112. In one or more embodiments, inner ring surface 130 may include an annular protrusion 132 extending therefrom. In one or more embodiments, annular protrusion 132 may have a rectangular or curved profile, rounded corners, other suitable shapes, or a combination thereof. Annular protrusion 132 may have a width 132w and a height 132h. In one or more embodiments, width 132w may be approximately $\frac{1}{32}$-$\frac{1}{8}$ of an inch and height 132h may be approximately $\frac{1}{16}$-$\frac{3}{16}$ of an inch. In one or more embodiments, annular protrusion 132 may engage annular groove 118 formed in exterior cylinder surface 112. In one or more embodiments, annular protrusion 132 may have a profile matching a profile of annular groove 118. In one or more embodiments, annular protrusion 132 may conform to annular groove 118 regardless of profile. In one or more embodiments, compression between inner ring surface 130 including annular protrusion 132 and exterior cylinder surface 112 including annular groove 118 may promote sealing therebetween. Sealing ring 122 may further include an exterior ring surface 134. Exterior ring surface 134 may engage cylindrical inner surface 36 adjacent to first bore end 36a. Exterior ring surface 134 may have a seal ring diameter RD2. In one or more embodiments, seal ring diameter RD2 may be greater than bore diameter DB1 and sealing ring 122 may be circumferentially compressed in order to dispose sealing ring 122 within through bore 32 of cylindrical inner surface 36. In one or more embodiments, compression between exterior ring surface 134 and cylindrical inner surface 36 may promote sealing therebetween.

It will be appreciated that because of the desire to limit collection of proppant and other debris between valve seat 100 and pump housing 12, in one or more embodiments, sealing ring 122 is secured around the first seat end 106 of valve seat 100 so that seal end surface 125 is substantially flush with valve seat end surface 109. In other embodiments, at least a portion of seal ring 122 extends beyond first seat end 106 when seal ring 122 is installed on valve seat 100. In one or more embodiments, seal end surface 125 forms an angle θ of zero degrees or more relative to valve seat end surface 109. In one or more embodiments, seal end surface 125 forms an angle of between θ and 15 degrees relative to valve seat end surface 109.

Figure 3A:
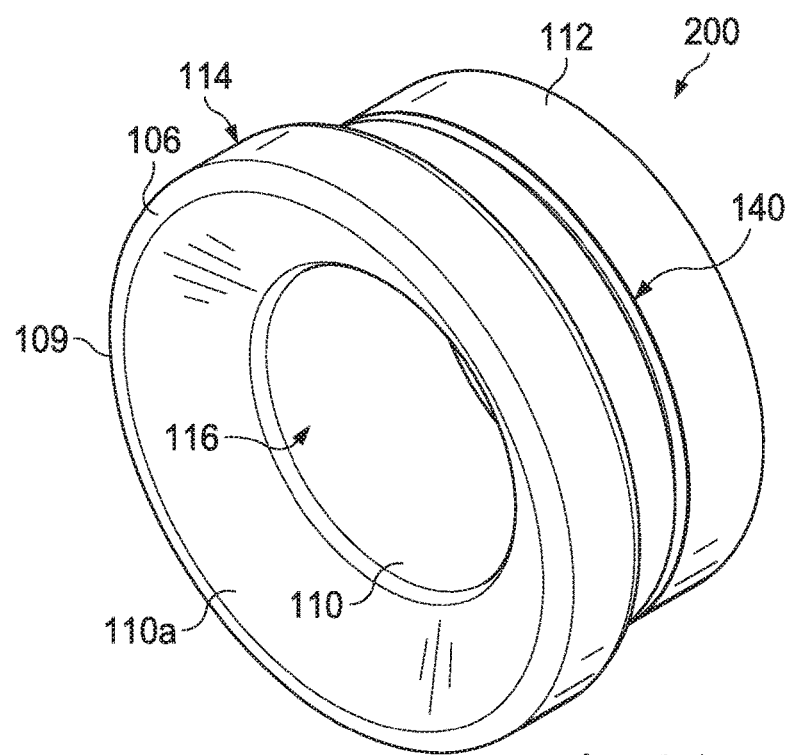
FIG. 3A is a perspective view of a valve seat in accordance with some embodiments.
Figure 3B:
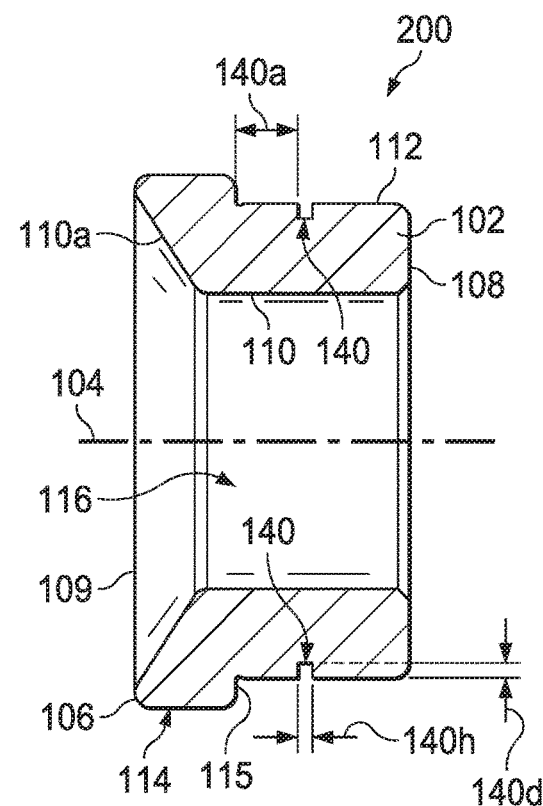
FIG. 3B is a side section view of the valve seat of FIG. 3A.

Referring now to FIGS. 3A-3B, perspective and side section views, respectively, of valve seat 200 are shown. Valve seat 200 includes a substantially cylindrical body 102 defined along an axis 104. Cylindrical body 102 includes a first or downstream seat end 106 and a second or upstream seat end 108. Cylindrical body 102 further includes an inner cylinder surface 110 and an exterior cylinder surface 112, each extending between first and second seat ends 106, 108. Cylindrical body 102 further includes a valve seat end surface 109 at first seat end 106. In one or more embodiments, inner cylinder surface 110 may include a tapered sealing face 110a for engaging a valve head (not shown). Valve seat 100 may include an annular flange 114 formed along exterior cylinder surface 112 adjacent to first seat end 106, the intersection of flange 114 and exterior cylinder surface 112 forming an annular shoulder 115. Valve seat 200 further includes a through bore 116 extending between first and second seat ends 106, 108. Through bore 116 has a through bore diameter TD1 adjacent to first seat end 106 and a through bore diameter TD2 adjacent to second seat end 108, in one or more embodiments, through bore diameter TD1 may be greater than through bore diameter TD2. In one or more embodiments, through bore 116 may expand from through bore diameter TD2 to through bore diameter TD1 adjacent to first seat end 106 in order to form a tapered sealing face 110a against which a valve head (not shown) may seat.

In one or more embodiments, valve seat 200 may include a leak detection notch 140 formed in exterior cylinder surface 112 between annular shoulder 115 and second seat end 108. In one or more embodiments, leak detection notch 140 may extend about the full circumference of exterior cylinder surface 112, while in other embodiments, the leak detection notch 140 may extend only partially around the exterior cylinder surface 112 whereby the notch has spaced apart ends (not shown). Although not limited to a particular shape, in one or more embodiments, leak detection notch 140 is annular. In other embodiments, leak detection notch 140 may extend fully around the exterior cylinder surface 112, but on a diagonal relative to 104, such that leak detection notch 140 is elliptical in shape. Leak detection notch 140 may include axially extending portions. In one or more other embodiments, leak detection notch 140 may be formed instead in cylindrical inner surface 36 adjacent second bore end 36b. Leak detection notch 140 may be axially spaced from annular shoulder 114 by a distance 140a. In one or more embodiments, distance 140a may be approximately ¼-1 inch. In one or more embodiments, leak detection notch 140 may have a rectangular or curved profile, rounded corners, other suitable shapes, or a combination thereof. Leak detection notch 140 may have a depth 140d and a height 140h. In one or more embodiments, depth 140d may be approximately 1/32-1/8 of an inch and height 140h may be approximately 1/32-1/8 of an inch. It will be appreciated that because leak detection notch 140 is provided as a reservoir to intercept leaking fluids and direct as a flow passage for fluid as described below, notch 140 may be shallower, deeper or wider than standard grooves which may be provided for sealing purposes. Thus, in one or more embodiments, the depth 140d of leak detection notch 140 is greater than the height 140h, which, would not serve the purpose of a standard circular o-ring seal since the depth would be too deep to allow sealing. In one or more other embodiments, the depth 140d is less than one-half the height 140h, which again, would not serve the purpose of a standard circular o-ring seal since the shallow depth would be insufficient to retain the o-ring during sealing. Likewise, in one or more other embodiments, the height 140h is greater than twice the depth 140d, which again, would not serve the purpose of a standard circular o-ring seal since the o-ring would not be secure but move axially in the leak detection notch 140. Valve seat 200 as described, may further incorporate structures from FIGS. 1, 2, and 5 without limitation.

Figure 4:
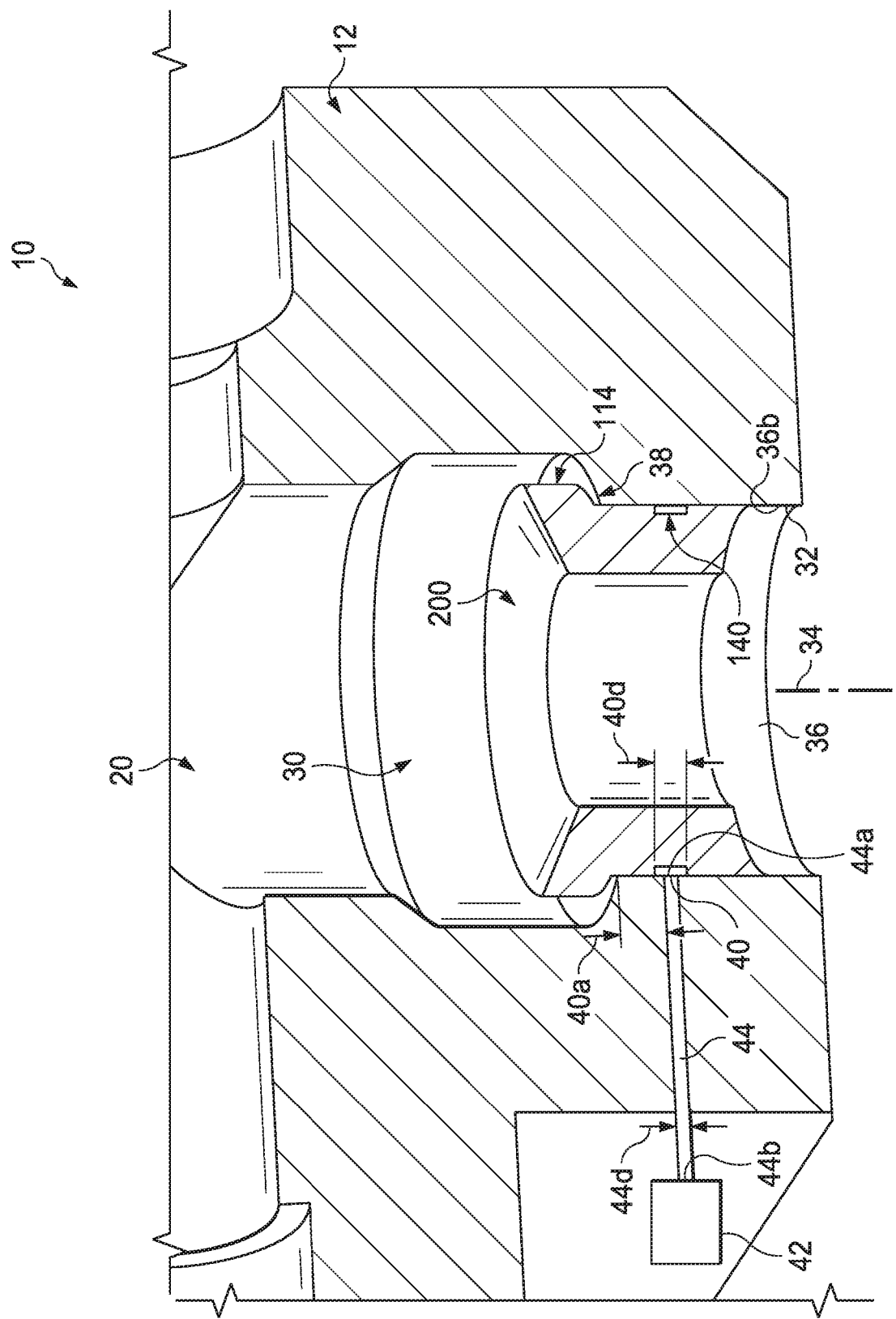
FIG. 4 is a close-up perspective view of a fluid end in accordance with some embodiments.

Referring now to FIG. 4, a close-up perspective section view of a portion of pump housing 12 is shown, and in particular, the first end 30 of pressure chamber 20 is shown having an embodiment of valve seat 200 disposed therein. In one or more embodiments, first end 30 may include an orifice 40 disposed along cylindrical inner surface 36 between annular shoulder 38 and second bore end 36b of pump housing 12. In the illustrated embodiment, one orifice 40 is shown. However, it will be appreciated that additional orifices 40 may be included. Orifice 40 may be spaced from annular shoulder 38 by a distance 40a. In one or more embodiments, distance 40a may be approximately ¼-1 inch. In one or more embodiments, distances 40a, 140a are selected to align orifice 40 with leak detection notch 140 when valve seat 200 is seated in first end 30. In one or more embodiments, distance 40a may be less than distance 140a. In one or more embodiments, when annular shoulder 115 of valve seat 200 abuts annular shoulder 38 of first end 30, distances 40a, 140a may be substantially equal to one another so that leak detection notch 140 and orifice 40 align. Orifice 40 may have a diameter 40d. In one or more embodiments, diameter 40d may be approximately 1/32-1/8 of an inch. In one or more embodiments, diameter 40d of orifice 40 may be smaller than the height 140h of leak detection notch 140. In one or more embodiments, diameter 40d of orifice 40 may be larger than the height 140h of leak detection notch 140. Orifice 40 may be in fluid communication with a sensor 42 via a fluid port 44 formed through pump housing 12. Although not limited to a particular type of sensor, in one or more embodiments, sensor 42 may be any pressure or flow rate sensor. Fluid port 44 may include a proximal end 44a intersecting orifice 40 and a distal end 44b exiting housing 12. Fluid port 44 may have a diameter 44d. In one or more embodiments, diameter 44d of fluid port 44 may be approximately equal to diameter 40d of orifice 40. In one or more embodiments, sensor 42 may be directly attached to housing 12 at distal end 44b. In one or more embodiments, sensor 42 may be otherwise attached to the reciprocating pump or to fluid end 10. In one or more embodiments, sensor 42 may be part of a standalone unit. In one or more embodiments, sensor 42 may be in fluid communication with distal end 44b via external tubing. In one or more embodiments, sensor 42 may send data to a PLC via wired or wireless communication.

In operation, one or more embodiments of valve seat 200 may be used for detection and measurement of leakage between valve seat 200 and cylindrical inner surface 36 of first end 30. In the process of reciprocating the plunger to draw fluid into the pump and reciprocating the plunger to drive fluid from the pump, fluid in pressure chamber 20 undergoes a cyclical pressurization during a discharge stroke. In one or more embodiments, pressurized fluid may migrate along exterior cylinder surface 112. The fluid may be captured in leak detection notch 140 of valve seat 200. In one or more embodiments, alignment between leak detection notch 140 and orifice 40 may enable fluid communication between leak detection notch 140 and sensor 42 via fluid port 44. Sensor 42 may detect the captured fluid within annular groove 140. In one or more embodiments, detection of captured fluid may include a pressure or a flow rate thereof, however, it will be appreciated that detection of any fluid by sensor 42 may be indicative of leakage that should be evaluated. In one or more embodiments, a working life of valve seat 200 may be evaluated based on the captured fluid. In one or more embodiments, working life may be evaluated based on the pressure or flow rate. In one or more embodiments, valve seat 200 may be replaced once the captured fluid reaches a threshold. In one or more embodiments, the threshold for replacement of valve seat 200 may be a threshold of pressure or flow rate.

Figure 5A:
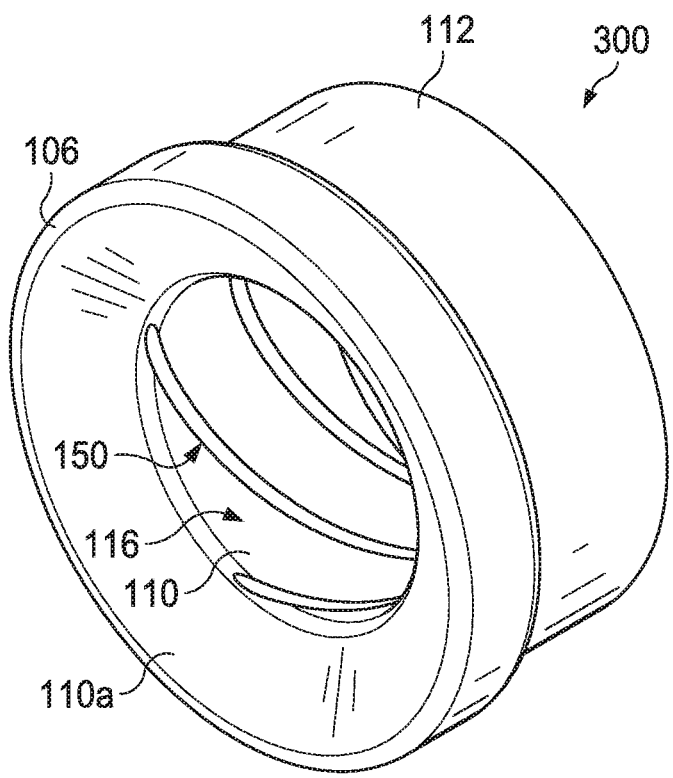
FIG. 5A is a perspective view of a valve seat in accordance with some embodiments.
Figure 5B:
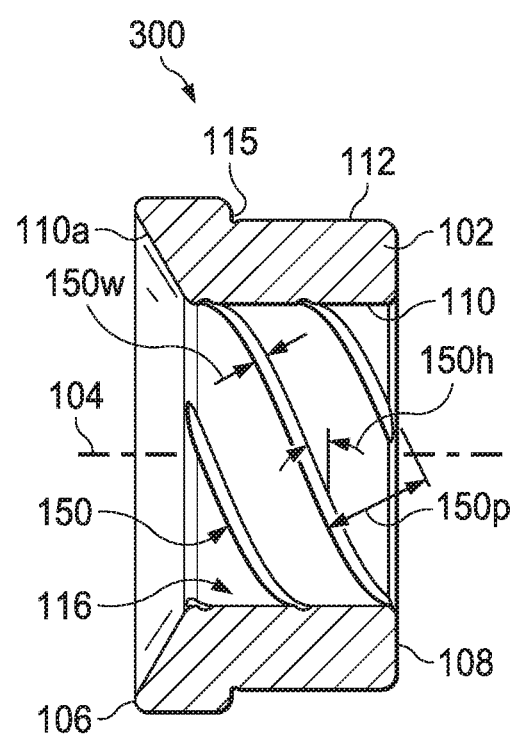
FIG. 5B is a side section view of the valve seat of FIG. 5A.

Referring now to FIGS. 5A-5B, perspective and side section views, respectively, of another embodiment of valve seat 300 are shown. Valve seat 300 includes a substantially cylindrical body 102 defined along an axis 104. Cylindrical body 102 includes a first or downstream seat end 106 and a second or upstream seat end 108. Cylindrical body 102 further includes an inner cylinder surface 110 and an exterior cylinder surface 112, each extending between first and second seat ends 106, 108. Cylindrical body 102 further includes a valve seat end surface 109 at first seat end 106. In one or more embodiments, inner cylinder surface 110 may include a tapered sealing face 110a for engaging a valve head (not shown). Valve seat 100 may include an annular flange 114 formed along exterior cylinder surface 112 adjacent to first seat end 106, the intersection of flange 114 and exterior cylinder surface 112 forming an annular shoulder 115. Valve seat 300 further includes a through bore 116 extending between first and second seat ends 106, 108. Through bore 116 has a through bore diameter TD1 adjacent to first seat end 106 and a through bore diameter TD2 adjacent to second seat end 108. In one or more embodiments, through bore diameter TD1 may be greater than through bore diameter TD2. In one or more embodiments, through bore 116 may expand from through bore diameter TD2 to through bore diameter TD1 adjacent to first seat end 106 in order to form a tapered sealing face 110a against which a valve head (not shown) may seat.

In one or more embodiments, valve seat 300 may include a helical feature 150 formed along inner cylinder surface 110 between first and second seat ends 106, 108. Helical feature 150 may extend along inner cylindrical surface 110 for at least a portion of the length of cylindrical body 102 between first and second seat ends 106, 108. In one or more embodiments, helical feature 150 may be right-hand threaded, while in other embodiments helical feature 150 may be left-hand threaded. In one or more embodiments, helical feature 150 may be formed only along a portion of through bore 116 having through bore diameter TD2 adjacent to second seat end 108. In one or more embodiments, helical feature 150 may be omitted from a portion of throughbore 116 adjacent to first seat end 106. In one or more embodiments, helical feature 150 may be omitted from tapered sealing face 110a.

While the cross-section of helical feature 150 is not limited to any particular shape, in one or more embodiments, helical feature 150 may have a rectangular or curved profile, rounded corners, other suitable shapes, or a combination thereof. Helical feature 150 may have a depth 150d, a width 150w, and a pitch 150p. In one or more embodiments, depth 150d may be approximately ⅟₃₂-⅛ of an inch and width 150w may be approximately ⅟₃₂-⅛ of an inch. In one or more embodiments pitch 150p may be approximately ¼-1 inch. Helical feature 150 may have a helix angle 150h. In one or more embodiments, helix angle 150h may be approximately 15-30°. In one or more embodiments, helical feature 150 may be a groove with the above described characteristics which groove is formed in inner cylinder surface 110, while in one or more other embodiments, helical feature 150 may be a protrusion with the above described characteristics which protrusion extends from in inner cylinder surface 110. Valve seat 300 as described, may further incorporate structures from FIGS. 1, 2, 3 and 4 without limitation.

In operation, one or more embodiments of valve seat 300 may be used for inducing rotation in a fluid flow through valve seat 300. In the process of reciprocating the plunger to draw fluid into the pump and reciprocating the plunger to drive fluid from the pump, suction and discharge valves undergo numerous open/close cycles. When the valve assembly is in a first closed configuration, a valve head (not shown) is seated on valve seat 300 forming a seal between through bore 116 and pressure chamber 20. As the plunger reciprocates in a first direction, the valve head lifts away from valve seat 300 and fluid is drawn into pressure chamber 20 through first end 30. In one or more embodiments, the fluid flow within through bore 116 interacts with helical feature 150 formed along inner cylinder surface 110. Such interaction may induce a rotation, swirl, or vortex effect in the fluid flow. When helical feature 150 is right-hand threaded, the fluid rotation may be clockwise. When helical feature 150 is left-hand threaded, the fluid rotation may be counterclockwise. In one or more embodiments, the fluid swirl may rotate the valve head about axis 34 relative to valve seat 300. Valve head rotation may change an angular orientation about axis 34 between the valve head and valve seat 300. As the plunger reciprocates in a second direction opposite the first direction, the valve head lowers onto valve seat 300 to a second closed configuration and fluid is driven from pressure chamber 20 through second end 40. In one or more embodiments, the valve head may be rotated by approximately 5-10° between the first and second closed configurations, however, it will be appreciated that the induced swirl or vortex may be altered by altering the depth 150d, width 150w, and helix angle 150h of helical feature 150, which in turn, can alter the rotation of the valve head relative to valve seat 300. In this way, the valve head sealing face may be prevented from engaging tapered sealing face 110a in the same angular orientation over many adjacent open/close cycles, thus leading to more consistent wear on the respective sealing faces. It will be appreciated that in one or more embodiments, valve seat 300 may be disposed in second end 40. Such embodiments may incorporate detailed description of the foregoing operational methods without limitation.

In one or more embodiments, helical feature 150 may offer additional advantages. One such advantage involves using helical feature 150 as a profile for engaging a valve seat removal tool. In one or more embodiments, helical feature 150 may provide a positive engagement with the removal tool. In one or more embodiments, helical feature 150 may provide a maximum contact area for the removal tool.

In the foregoing, various embodiments are provided to address the present shortcomings with conventional valve seats used in fluid ends of reciprocating pumps. It will be appreciated that any and all features of various embodiments described herein may be used individually or in combination in a single application of a valve seat and/or fluid end.

It is evident by the foregoing description that the subject application has other significant benefits and advantages. The various embodiments are amenable to various changes and modifications without departing from the spirit thereof. The particular embodiments disclosed above are illustrative only, as the system and method may be modified and practiced in different but equivalent manners apparent to those skilled in the art having the benefit of the teachings herein. It is therefore evident that any alterations, modifications, and all such variations are considered within the scope and spirit of the application is apparent that a system and method with significant advantages has been described and illustrated.

What is claimed:

1. A valve seat for a fluid end of a hydraulic fracturing pump, the valve seat comprising:
    a substantially cylindrical body defined along an axis and having a first seat end and a second seat end with a through bore extending between the first and second seat ends, the cylindrical body further having a valve seat end surface at the first seat end, an inner cylindrical surface, an exterior cylindrical surface and an annular flange protruding outward perpendicularly from the axis of the cylindrical body adjacent the first seat end, wherein the annular flange forms the outermost cylindrical surface of the cylindrical body, an intersection of the annular flange and the exterior cylindrical surface forming an annular shoulder and the through bore expanding from a first diameter to a second diameter adjacent the first seat end; and
    a non-metallic seal disposed about the annular flange between the annular shoulder and the first seat end, the seal having a first end and a second end with a seal end surface formed at the first end of the seal, wherein the non-metallic seal is selected from the group consisting of elastomers, polymers, and engineered plastics.

2. The valve seat of claim 1, wherein the non-metallic seal is an elongated sealing ring.

3. The valve seat of claim 1, wherein the seal end surface of the non-metallic seal and the valve seat end surface are substantially flush.

4. The valve seat of claim 1, further comprising an annular groove formed in the annular flange, wherein the non-metallic seal is an elongated sealing ring, the sealing ring having a through bore extending between the first and second ends, the sealing ring further having an inner ring surface with an annular protrusion extending from the inner ring surface.

5. The valve seat of claim 4, wherein the annular protrusion of the sealing ring engages the annular groove of the cylindrical body.

6. The valve seat of claim 1, wherein at least a portion of the seal end surface of the non-metallic seal extends beyond the first seat end.

7. A valve seat for a fluid end of a hydraulic fracturing pump, the valve seat comprising:
    a substantially cylindrical body defined along an axis and having a first seat end and a second seat end with a through bore extending between the first and second seat ends, the cylindrical body further having a valve seat end surface at the first seat end, an inner cylinder surface and an exterior cylinder surface with an annular flange protruding outward perpendicularly from the axis of the cylindrical body, the annular flange having an upper flange surface adjacent the first seat end and a lower flange surface intersecting the exterior cylinder surface, the intersection of the lower flange surface and the exterior cylinder surface forming an annular shoulder facing away from the first seat end towards the second seat end and the through bore expanding from a first diameter to a second diameter adjacent the first seat end, and an annular groove formed in the annular flange; and
    a non-metallic sealing ring disposed about the exterior cylinder surface adjacent the first seat end, the sealing ring having a first end and a second end with a seal end surface formed at the first end of the sealing ring, the sealing ring further having an inner ring surface with an annular protrusion extending from the inner ring surface,
    wherein the annular protrusion of the sealing ring engages the annular groove of the cylindrical body,
    wherein the non-metallic seal is selected from the group consisting of elastomers, polymers, and engineered plastics.

8. The valve seat of claim 7, wherein the seal end surface is flush with the valve seat end surface of the cylindrical body.

9. The valve seat of claim 7, wherein the seal end surface of the non-metallic sealing ring extends beyond the valve seat end surface.

10. The valve seat of claim 9, wherein the seal end surface of the non-metallic sealing ring is angled relative to the valve seat end surface.

11. The valve seat of claim 10, wherein an angle is formed between the seal end surface of the non-metallic sealing ring and the valve seat end surface, and the angle is between 0 and 15 degrees relative to valve seat end surface.

* * * * *